(12) United States Patent
Sakagami et al.

(10) Patent No.: US 8,603,633 B2
(45) Date of Patent: *Dec. 10, 2013

(54) MULTILAYER SHEET FOR LASER MARKING

(75) Inventors: Toshinori Sakagami, Yokkaichi (JP); Akira Shimizu, Yokkaichi (JP); Akira Hashimoto, Yokkaichi (JP)

(73) Assignee: Japan Coloring Co., Ltd., Yokkaichi-Shi (JP)

( * ) Notice: Subject to any disclaimer, the term of this patent is extended or adjusted under 35 U.S.C. 154(b) by 222 days.

This patent is subject to a terminal disclaimer.

(21) Appl. No.: 12/993,846

(22) PCT Filed: May 13, 2009

(86) PCT No.: PCT/JP2009/058935
§ 371 (c)(1),
(2), (4) Date: Nov. 22, 2010

(87) PCT Pub. No.: WO2009/145059
PCT Pub. Date: Dec. 3, 2009

(65) Prior Publication Data
US 2011/0076452 A1 Mar. 31, 2011

(30) Foreign Application Priority Data
May 26, 2008 (JP) .................................. 2008-137026

(51) Int. Cl.
B32B 27/36 (2006.01)
B32B 27/06 (2006.01)
B32B 5/16 (2006.01)

(52) U.S. Cl.
USPC .............................. 428/412; 428/480; 428/323

(58) Field of Classification Search
None
See application file for complete search history.

(56) References Cited

U.S. PATENT DOCUMENTS 5,475,037 A * 12/1995 Park et al. ........................ 521/79
5,998,005 A * 12/1999 Kanno ............................ 428/221

(Continued)

FOREIGN PATENT DOCUMENTS

EP 1852269 11/2007
JP 10-071763 3/1998

(Continued)

OTHER PUBLICATIONS

Written Opinion of the International Searching Authority for International Applications No. PCT/JP2009/058935, Aug. 4, 2009. (Provided in Japanese Language).*

(Continued)

*Primary Examiner* — D. Lawrence Tarazano
*Assistant Examiner* — Donald M Flores, Jr.
(74) *Attorney, Agent, or Firm* — Ditthavong Mori & Steiner, P.C.

(57) ABSTRACT

A laser marking multilayer sheet includes a multilayer sheet A, and a multilayer sheet B that is stacked under the multilayer sheet A. The multilayer sheet A is a transparent laser marking multilayer sheet. A skin layer that forms each outermost layer of the multilayer sheet A is formed of a noncrystalline aromatic polyester resin composition, and a core layer of the multilayer sheet A is formed of a polycarbonate resin composition. The multilayer sheet B is a colored laser marking multilayer sheet. A skin layer that forms each outermost layer of the multilayer sheet B is formed of a noncrystalline aromatic polyester resin composition, and a core layer of the multilayer sheet B is formed of a polycarbonate resin composition.

20 Claims, 2 Drawing Sheets

(56) References Cited

U.S. PATENT DOCUMENTS

| | | | |
|---|---|---|---|
| 8,322,752 B2* | 12/2012 | Sakagami et al. | 428/207 |
| 2004/0265552 A1* | 12/2004 | Lutz et al. | 428/212 |
| 2005/0249938 A1* | 11/2005 | Raupach et al. | 428/323 |
| 2007/0080146 A1* | 4/2007 | Stockum et al. | 219/121.6 |
| 2008/0076065 A1* | 3/2008 | Bennett et al. | 430/285.1 |
| 2011/0123766 A1* | 5/2011 | Sakagami et al. | 428/141 |

FOREIGN PATENT DOCUMENTS

| | | |
|---|---|---|
| JP | 2002-273832 | 9/2002 |
| JP | 2003-285581 | 10/2003 |
| JP | 2003285581 A * | 10/2003 |
| JP | 2007-210166 | 8/2007 |
| JP | 3889431 B1 | 8/2007 |
| WO | WO 2006/087965 | 8/2006 |
| WO | 2006/087965 | 8/2007 |

OTHER PUBLICATIONS

International Search Report for International Application No. PCT/JP2009/058935, Aug. 4, 2009.

Written Opinion of the International Searching Authority for International Application No. PCT/JP2009/058935, Aug. 4, 2009.

* cited by examiner

MULTILAYER SHEET FOR LASER MARKING

TECHNICAL FIELD

The present invention relates to a laser marking multilayer sheet. More particularly, the present invention relates to a laser marking multilayer sheet that can be marked without being damaged by applying a laser beam, ensures high contrast between the base area (color) and the print area, presents clear characters, symbols, or images, exhibits excellent heat resistance, and may suitably be used for an electronic passport, a plastic card, or the like.

BACKGROUND ART

Along with recent progress in international exchange, an identification card (e.g., ID card, IC card, or passport) that records personal information (particularly an identification card issued by a public agency or a reliable organization) has become increasingly important as an identification means.

Since the September, 2001 spontaneous worldwide multiple terrorist attacks, each country has taken countermeasures such as placing strict controls on entry into and exit from the country. For example, an electronic passport that was standardized by the International Civil Aviation Organization (ICAO) of the United Nations and includes an IC chip into or from which personal information can be written or read, has been introduced. An ID card, an IC card, or the like that records a large amount of information that specifies an individual has also been developed. An identification card (e.g., ID card, IC card, or passport) is normally configured so that personal information (e.g., name, symbols, characters, and photograph) is displayed on the card, sheet, or the like.

Since such an ID card, IC card, or passport specifies an individual, the reliability of the identification card decreases if a third party other than a public agency or a reliable organization can easily falsify or forge the personal information. Such a situation hinders progress in international exchange.

Therefore, it is important to prevent falsification or forging of an identification card such as an electronic passport, an ID card, or an IC card. Specifically, it is important to display a clear image on a small electronic passport, ID card, IC card, or the like with high contrast in order to prevent falsification, forging, or the like.

In view of the above situation, technology of laser marking a name, symbols, characters, photograph, or the like using a laser marking multilayer sheet has attracted attention. For example, Patent Documents 1 and 2 disclose such laser marking technology.

Patent Document 1 aims at providing a laser marking multilayer sheet that is not externally damaged, ensures high contrast, and has excellent surface flatness, and discloses a laser marking multilayer sheet that includes at least (A) a surface layer formed of a transparent thermoplastic resin, and (B) an inner layer formed of a thermoplastic resin composition that includes (b-1) based on 100 parts by weight of a thermoplastic resin, (b-2) 0.01 to 5 parts by weight of a laser beam energy absorber, and (b-3) 0.5 to 7 parts by weight of a coloring agent, the surface layer and the inner layer being formed by a melt coextrusion method.

Patent Document 2 aims at providing a laser marking multilayer sheet that is not externally damaged, ensures high contrast, and has excellent surface flatness and excellent heat resistance, and discloses a laser marking multilayer sheet (first surface layer/inner layer/second surface layer) that includes (A) first and second surface layers formed of a thermoplastic resin composition that includes based on 100 parts by weight of a transparent thermoplastic resin, 0.001 to 5 parts by weight of mica and/or carbon black, and (B) an inner layer formed of a thermoplastic resin composition that includes based on 100 parts by weight of a thermoplastic resin, 0.001 to 3 parts by weight of a laser beam energy absorber, the thickness ratio of the first surface layer, the inner layer, and the second surface layer being 1:4:1 to 1:10:1, and the first surface layer, the inner layer, and the second surface layer being formed by a melt coextrusion method.

The laser marking multilayer sheets disclosed in Patent Documents 1 and 2 exhibit excellent thermal adhesiveness with another laser marking multilayer sheet or a thermoplastic resin sheet (e.g., PETG sheet or ABS resin sheet), and ensure that characters and numerals can be satisfactorily printed by laser marking (i.e., applying a laser beam). However, the laser marking multilayer sheets disclosed in Patent Documents 1 and 2 have a problem in that an image (e.g., face) such as that printed on an identification card (e.g., ID card, IC card, or passport) cannot be necessarily satisfactorily formed. Specifically, it is not sufficiently handled how personal information such as name, symbols, characters and photograph is clearly displayed within narrow dimensions.

Related-Art Document

Patent Document

Patent Document 1: JP-A-2002-273832

Patent Document 2: Japanese Patent No. 3889431

DISCLOSURE OF THE INVENTION

The present invention was conceived in order to solve the above problems. An object of the present invention is to provide a laser marking multilayer sheet that exhibits excellent laser marking capability, ensures high contrast between the base area (color) and the print area so that clear characters, symbols, or images can be obtained, exhibits excellent thermal adhesiveness when producing the multilayer sheet, and exhibits transfer capability, releasability from a mold after hot pressing, heat resistance, and bendability in combination. In particular, the laser marking multilayer sheet must advantageously prevent falsification and forging.

Specifically, the present invention provides the following laser marking multilayer sheet.

[1] A laser marking multilayer sheet including a multilayer sheet A, and a multilayer sheet B that is stacked on the multilayer sheet A, the multilayer sheet A being a transparent laser marking multilayer sheet that includes a skin layer and a core layer, and includes at least three layers stacked by a coextrusion method, the skin layer that forms each outermost layer of the multilayer sheet A being formed of a noncrystalline aromatic polyester resin composition that includes based on 100 parts by mass of a copolyester resin, 0.01 to 3 parts by mass of at least one lubricant selected from a fatty acid ester, a fatty acid amide, and a fatty acid metal salt, the copolyester resin including dicarboxylic acid units mainly including terephthalic acid units, ethylene glycol units (I), and glycol units mainly including 1,4-cyclohexanedimethanol units (II), the ratio ((I)/(II)) of the ethylene glycol units (I) to the 1,4-cyclohexanedimethanol units (II) being 90 to 30/10 to 70 mol %, the core layer of the multilayer sheet A being formed of a polycarbonate resin composition that includes based on 100 parts by mass of a polycarbonate resin, 0.0001 to 3 parts by mass of carbon black that is an energy absorber, or a mixture of 0.0001 to 3 parts by mass of carbon black and 0 to 6 parts by mass of at least one compound selected from a metal oxide, a metal sulfide, a metal carbonate, and a metal silicate having an average particle size of less than 150 nm, the multilayer sheet A having a total thickness of 50 to 150 μm, and the thickness of the core layer accounting for 35% or more and less than 85% of the total thickness of the multilayer sheet A, the multilayer sheet B being a colored laser marking multilayer sheet that includes a skin layer and a core layer, and includes at least three layers stacked by a coextrusion method, the skin layer that forms each outermost layer of the multilayer sheet B being formed of a noncrystalline aromatic polyester resin composition that includes based on 100 parts by mass of a copolyester resin, 0 to 3 parts by mass of at least one lubricant selected from a fatty acid ester, a fatty acid amide, and a fatty acid metal salt, the copolyester resin including dicarboxylic acid units mainly including terephthalic acid units, ethylene glycol units (I), and glycol units mainly including 1,4-cyclohexanedimethanol units (II), the ratio ((I)/(II)) of the ethylene glycol units (I) to the 1,4-cyclohexanedimethanol units (II) being 90 to 30/10 to 70 mol %, the core layer of the multilayer sheet B being formed of a polycarbonate resin composition that includes based on 100 parts by mass of a polycarbonate resin, 0.0001 to 3 parts by mass of carbon black that is an energy absorber, or a mixture of 0.0001 to 3 parts by mass of carbon black and 0 to 6 parts by mass of at least one compound selected from a metal oxide, a metal sulfide, a metal carbonate, and a metal silicate, and 1 part by mass or more of an inorganic pigment, the multilayer sheet B having a total thickness of 50 to 250 μm, and the thickness of the core layer accounting for 35% or more and less than 85% of the total thickness of the multilayer sheet B.

[2] The laser marking multilayer sheet according to [1], wherein the surface of the multilayer sheet A and/or the multilayer sheet B has been provided with a mat finish with an average roughness (Ra) of 0.1 to 5 μm.

[3] The laser marking multilayer sheet according to [1] or [2], wherein the core layer and/or the skin layer of the multilayer sheet A and/or the multilayer sheet B includes 0.1 to 5 parts by mass of an antioxidant and/or a coloring inhibitor and 0.1 to 5 parts by mass of a UV absorber and/or a light stabilizer based on 100 parts by mass of the thermoplastic resin.

[4] The laser marking multilayer sheet according to any one of [1] to [3], the laser marking multilayer sheet being used for an electronic passport.

[5] The laser marking multilayer sheet according to any one of [1] to [3], the laser marking multilayer sheet being used for a plastic card.

[6] A method of laser marking the laser marking multilayer sheet according to any one of [1] to [5], comprising printing on the laser marking multilayer sheet by applying a laser beam to the laser marking multilayer sheet through the multilayer sheet A.

The above laser marking multilayer sheet exhibits excellent laser marking capability, and ensures high contrast between the base area (color) and the print area so that clear characters, symbols, or images can be obtained. Moreover, the above laser marking multilayer sheet exhibits excellent thermal adhesiveness when producing the multilayer sheet, and exhibits transfer capability, releasability from a mold after hot pressing, heat resistance, and bendability in combination. In particular, the above laser marking multilayer sheet can advantageously prevent falsification and forging.

DESCRIPTION OF EXEMPLARY EMBODIMENTS

Preferred embodiments of the laser marking multilayer sheet according to the present invention are described in detail below. Note that the present invention is not limited to the following embodiments. The present invention encompasses a wide range of laser marking multilayer sheets that satisfy the requirements of the present invention.

Figure 1:
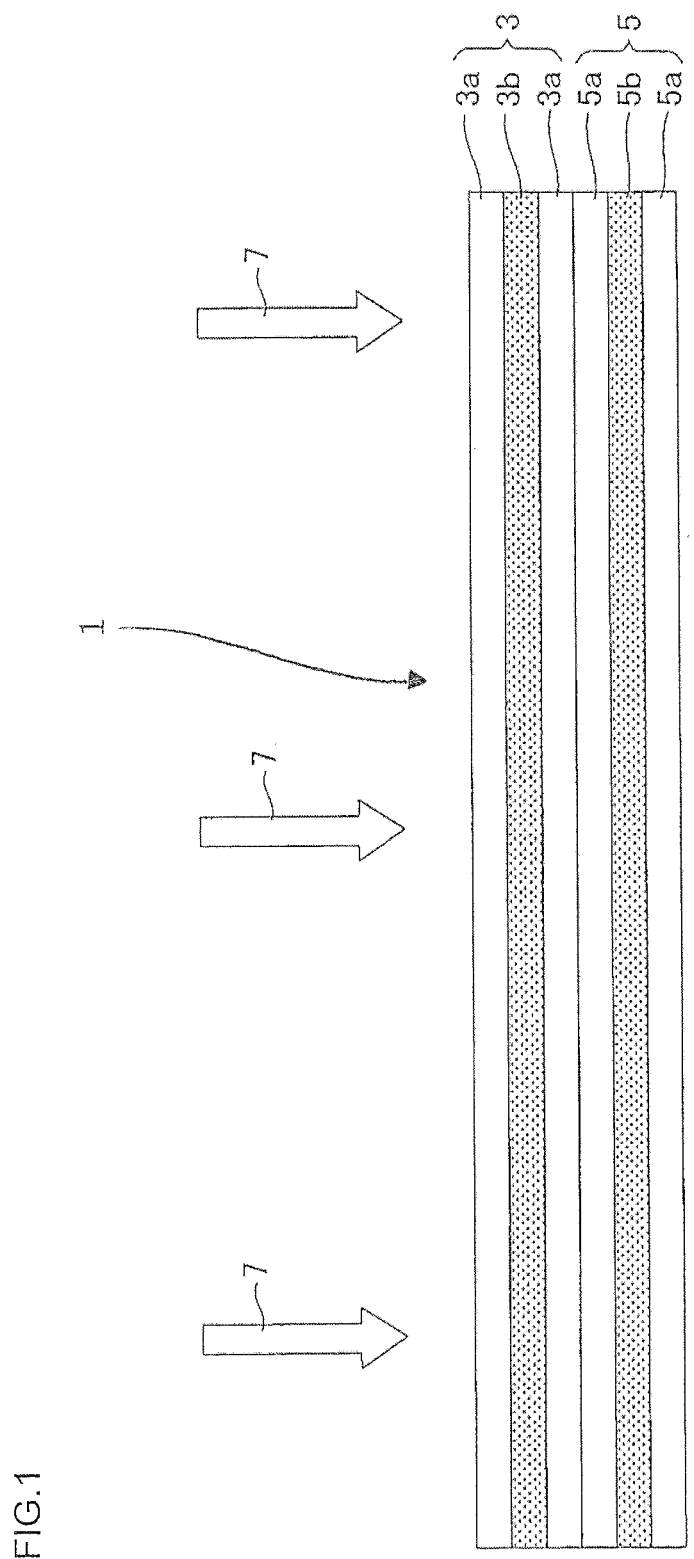
FIG. 1 is a schematic cross-sectional view showing a laser marking multilayer sheet according to one embodiment of the present invention.

[1] As shown in FIG. 1, a laser marking multilayer sheet 1 according to one embodiment of the present invention includes a multilayer sheet A (reference numeral 3), and a multilayer sheet B (reference numeral 5) that is stacked on the multilayer sheet A. The multilayer sheet A is a transparent laser marking multilayer sheet that includes a skin layer 3a and a core layer 3b, and includes at least three layers stacked by a coextrusion method. The skin layer 3a that forms each outermost layer of the multilayer sheet A is formed of a noncrystalline aromatic polyester resin composition that includes based on 100 parts by mass of a copolyester resin, 0.01 to 3 parts by mass of at least one lubricant selected from a fatty acid ester, a fatty acid amide, and a fatty acid metal salt, the copolyester resin including dicarboxylic acid units mainly including terephthalic acid units, ethylene glycol units (I), and glycol units mainly including 1,4-cyclohexanedimethanol units (II), the ratio ((I)/(II)) of the ethylene glycol units (I) to the 1,4-cyclohexanedimethanol units (II) being 90 to 30/10 to 70 mol %. The core layer 3b of the multilayer sheet A is formed of a polycarbonate resin composition that includes based on 100 parts by mass of a polycarbonate resin, 0.0001 to 3 parts by mass of carbon black that is an energy absorber, or a mixture of 0.0001 to 3 parts by mass of carbon black and 0 to 6 parts by mass of at least one compound selected from a metal oxide, a metal sulfide, a metal carbonate, and a metal silicate having an average particle size of less than 150 nm. The multilayer sheet A has a total thickness of 50 to 150 μm, and the thickness of the core layer accounts for 35% or more and less than 85% of the total thickness of the multilayer sheet A. The multilayer sheet B (reference numeral 5) is a colored laser marking multilayer sheet that includes a skin layer 5a and a core layer 5b, and includes at least three layers stacked by a coextrusion method. The skin layer 5a that forms each outermost layer of the multilayer sheet B is formed of a noncrystalline aromatic polyester resin composition that includes based on 100 parts by mass of a copolyester resin, 0 to 3 parts by mass of at least one lubricant selected from a fatty acid ester, a fatty acid amide, and a fatty acid metal salt, the copolyester resin including dicarboxylic acid units mainly including terephthalic acid units, ethylene glycol units (I), and glycol units mainly including 1,4-cyclohexanedimethanol units (II), the ratio ((I)/(II)) of the ethylene glycol units (I) to the 1,4-cyclohexanedimethanol units (II) being 90 to 30/10 to 70 mol %. The core layer 5b of the multilayer sheet B is formed of a polycarbonate resin composition that includes based on 100 parts by mass of a polycarbonate resin, 0.0001 to 3 parts by mass of carbon black that is an energy absorber, or a mixture of 0.0001 to 3 parts by mass of carbon black and 0 to 6 parts by mass of at least one compound selected from a metal oxide, a metal sulfide, a metal carbonate, and a metal silicate, and 1 part by mass or more of an inorganic pigment. The multilayer sheet B has a total thickness of 50 to 250 μm, and the thickness of the core layer accounts for 35% or more and less than 85% of the total thickness of the multilayer sheet B.

[A] Configuration of Multilayer Sheet A

The multilayer sheet A is the transparent laser marking multilayer sheet that includes the skin layer and the core layer, and includes at least three layers stacked by a coextrusion method.

[A-1] Three-layer Sheet

The multilayer sheet A includes at least three layers including the skin layer and the core layer, and is formed by a coextrusion method. Note that the term "three-layer sheet" used herein refers to a sheet that includes at least three layers, and is not limited to a sheet having a three-layer structure. Specifically, the transparent laser marking multilayer sheet A is referred to as "three-layer sheet" for convenience of illustration. The term "three-layer sheet" refers to a sheet that includes at least three layers, and is not limited to a sheet that includes only three layers. Specifically, the multilayer sheet A may include five layers, seven layers, or an odd number of layers more than seven layers.

Even when the multilayer sheet A has such a multilayer structure, the skin layer is disposed to form each outermost layer of the sheet having a multilayer structure so that the core layer is positioned between the skin layers. The thickness of the skin layer is not particularly limited, but the skin layer is preferably formed to have a thickness within a given range described later.

When the multilayer sheet A includes an odd number of layers more than seven layers, the thickness of the skin layer and the core layer may decrease to a large extent if the number of layers is too large, so that a mold sticking phenomenon may occur during hot pressing when stacking the layers. Therefore, the number of layers of the multilayer sheet A is preferably three to five, and more preferably three.

Note that a multilayer sheet that includes an even number of layers is configured in the same manner as a multilayer sheet that includes an odd number of layers. For example, a multilayer sheet that includes four layers has a skin layer (glycol-modified polyethylene terephthalate (PETG))/core layer (PC)/core layer (PC)/skin layer (PETG) configuration that is similar to that of a multilayer sheet that includes an odd number of layers.

When the multilayer sheet includes three layers, the multilayer sheet has a skin layer (PETG)/core layer (PC)/skin layer (PETG) configuration so that the skin layer forms each outermost layer, and the core layer is positioned between the skin layers. When the multilayer sheet includes five layers, the multilayer sheet may have a skin layer (PETG)/core layer (PC)/skin layer (PETG)/core layer (PC)/skin layer (PETG) configuration so that the skin layer forms each outermost layer, and the skin layers and the core layers are alternately disposed. It is possible to implement sufficient thermal adhesiveness by forming a multilayer sheet having such a multilayer structure, and the transfer capability of the sheet when stacking the layers, releasability of the sheet from a mold after hot pressing, the bendability and the transparency of the sheet, and the like can be finely adjusted.

It is preferable that the three-layer sheet have a thickness (total thickness) of 50 to 150 μm, and the thickness of the core layer account for 35% or more and less than 85% of the total thickness of the three-layer sheet. If the total thickness of the three-layer sheet is less than 50 μm, the multilayer sheet may stick to a mold (i.e., mold sticking phenomenon) during heating (thermal bonding) when producing the multilayer sheet. In order to prevent such a problem, it is necessary to control the bonding temperature, the press pressure during bonding, the bonding time, and the like. This makes the forming process complex. If the total thickness of the three-layer sheet is more than 150 μm, the thickness of an electronic passport multilayer sheet produced using the three-layer sheet increases to a large extent. When using the three-layer sheet for a plastic card, the total thickness of the card may exceed 800 μm (i.e., the maximum thickness defined by a normal contact/contactless card standard). This impairs the versatility of the card. It is preferable that the thickness of the core layer account for 35% or more and less than 85% of the total thickness of the multilayer sheet A. If the thickness of the skin layer is too small, a mold sticking phenomenon and a decrease in thermal adhesiveness may occur. If the thickness of the skin layer is too large, the thickness of the core layer necessarily decreases, so that the laser marking capability may deteriorate, or the multilayer sheet may warp, for example.

It is possible to easily obtain the desired properties (local properties) of the multilayer sheet A by adjusting the total thickness of the three-layer sheet to the desired value. Moreover, it is possible to easily obtain the desired properties of the laser marking multilayer sheet (i.e., a multilayer sheet that includes the multilayer sheet A and the multilayer sheet B). The total thickness of the three-layer sheet can be adjusted within the desired range, and the laser marking capability can be easily improved by adjusting the total thickness of the skin layer and the core layer that form the three-layer sheet within the above desired range in addition to the thickness of the three-layer sheet.

The adhesiveness of the multilayer sheet and prevention of a mold sticking phenomenon are important factors from the viewpoint of ensuring practical applications and the productivity of the multilayer sheet, dealing with market needs, and the like. The relationship between the total thickness of the three-layer sheet and the thickness of the skin layer and the core layer is described in detail later.

[A-1-1] Skin Layer of Multilayer Sheet A

The skin layer of the multilayer sheet A forms each outermost layer of the three-layer sheet. Specifically, the skin layer serves as the surface layer (outermost layer) of the three-layer sheet that covers either side (outer side) of the core layer of the multilayer sheet A described later.

It is preferable that each skin layer have an identical thickness. If the multilayer sheet A includes skin layers that differ in thickness, the sheet may warp during pressing or the like. For example, when the multilayer sheet has a skin layer (PETG)/core layer (PC)/skin layer (PETG) configuration, and the thickness of the core layer accounts for 35% or more and less than 85% of the thickness of the multilayer sheet A, the total thickness of the skin layers accounts for 15% or more and less than 65% of the thickness of the multilayer sheet A. If the thickness of the skin layer is too small, a mold sticking phenomenon and a decrease in thermal adhesiveness may occur. If the thickness of the skin layer is too large, the thickness of the core layer necessarily decreases, so that the laser marking capability may deteriorate, or the multilayer sheet may warp, for example.

The skin layer is formed of a noncrystalline aromatic polyester resin composition prepared by materials containing a polyester resin composition (i.e., a copolyester resin (see [A-1-1-1]) and a lubricant (see [A-1-1-2]) described later).

[A-1-1-1] Copolyester Resin

The copolyester resin is used as a main component of the noncrystalline aromatic polyester resin composition. The copolyester resin includes dicarboxylic acid units mainly including terephthalic acid units, ethylene glycol units (I), and glycol units mainly including 1,4-cyclohexanedimethanol units (II), the ratio ((I)/(II)) of the ethylene glycol units (I) to the 1,4-cyclohexanedimethanol units (II) being 90 to 30/10 to 70 mol %. The ethylene glycol content and the 1, 4-cyclohexanedimethanol content in the copolyester resin are adjusted for the following reasons. Specifically, if the ethylene glycol content is more than 90 mol %, the copolyester resin may be insufficiently noncrystalline, and recrystallization may proceed during cooling after thermal bonding (i.e., thermal adhesiveness may deteriorate). If the ethylene glycol content is less than 30 mol %, the copolyester resin may be insufficiently noncrystalline, and recrystallization may proceed during cooling after thermal bonding (i.e., thermal adhesiveness may deteriorate). A copolyester resin obtained by adjusting the glycol content and the 1,4-cyclohexanedimethanol content within the above range is sufficiently noncrystalline, and exhibits excellent thermal adhesiveness.

Examples of the copolyester resin include a noncrystalline aromatic polyester resin in which about 30 mol % of the ethylene glycol component of polyethylene terephthalate is substituted with 1,4-cyclohexanedimethanol. Such noncrystalline aromatic polyester resin is manufactured by Eastman Chemical Company and commercially available.

[A-1-1-2] Lubricant

Based on 100 parts by mass of the copolyester resin which includes dicarboxylic acid units mainly including terephthalic acid units, ethylene glycol units (I), and glycol units mainly including 1,4-cyclohexanedimethanol units (II), the ratio ((I)/(II)) of the ethylene glycol units (I) to the 1,4-cyclohexanedimethanol units (II) being 90 to 30/10 to 70 mol %, at least one lubricant selected from a fatty acid ester, a fatty acid amide, and a fatty acid metal salt is prepared for addition to the polyester resin as a lubricant used for the present embodiment. The lubricant is preferably used in an amount of 0.01 to 3 parts by mass, and more preferably 0.05 to 1.5 parts by mass. If the amount of the lubricant is less than 0.01 parts by mass, the composition may adhere to a press plate during hot pressing. If the amount of the lubricant is more than 3 parts by mass, thermal adhesiveness may deteriorate.

Examples of the fatty acid ester lubricant include butyl stearate, cetyl palmitate, monoglyceride stearate, diglyceride stearate, triglyceride stearate, esters of montan acid wax, wax esters, dicarboxylates, complex esters, and the like. Examples of the fatty acid amide lubricant include stearic acid amide, ethylenebisstearamide, and the like. Examples of the fatty acid metal salt lubricant include calcium stearate, magnesium stearate, zinc stearate, aluminum stearate, barium stearate, and the like.

[A-1-2] Core Layer of Multilayer Sheet A

The core layer is positioned in the center of the three-layer sheet. That is the nuclear layer. Specifically, the core layer is formed so that the core layer is positioned between the two skin layers disposed on outermost side of the layers. It is formed of the central nuclear layer of the three-layer sheet. It is preferable that the thickness of the core layer account for 35% or more and less than 85% of the total thickness of the sheets. It is more preferable that the thickness of the core layer account for 40% or more and less than 80% of the thickness of the multilayer sheet A. If the thickness of the core layer accounts for 85% or more of the thickness of the multilayer sheet A, the thickness of the skin layer relatively decreases since the total thickness of the multilayer sheet A is as small as 50 to 150 μm. As a result, even if the skin layer includes the lubricant, the multilayer sheet A may stick to a mold during hot pressing when stacking the layers (i.e., a mold sticking phenomenon may occur). If the thickness of the core layer accounts for less than 35% or more of the thickness of the multilayer sheet A, the laser marking capability may deteriorate, or the sheet may warp due to a decrease in heat resistance, although a mold sticking phenomenon does not occur since the skin layer has a sufficient thickness.

As a substance (material) for the core layer, a polycarbonate resin, particularly a transparent polycarbonate resin, can be used. The polycarbonate resin is not particularly limited, but it is preferable to use a polycarbonate resin having a melt volume rate of 4 to 20. If the melt volume rate of the polycarbonate resin is less than 4, the toughness of the resulting sheet is improved, but the moldability of the polycarbonate resin may deteriorate. If the melt volume rate of the polycarbonate resin is more than 20, the toughness of the resulting sheet may deteriorate.

[A-1-3] Energy Absorber

The energy absorber may be at least one compound selected from carbon black, a metal oxide, a metal sulfide, a metal carbonate, and a metal silicate.

It is preferable that carbon black have an average particle size of 10 to 90 nm and a dibutyl phthalate (DBP) absorption of 60 to 170 ml/100 g. If the average particle size of carbon black is less than 10 nm, the laser color development capability may decrease, and handling may become difficult. If the average particle size of carbon black is more than 90 nm, the transparency of the sheet may decrease, or large elevations and depressions may be formed on the surface of the sheet. If the DBT absorption of carbon black is less than 60 ml/100 g, the dispersibility of carbon black may deteriorate. If the DBT absorption of carbon black is more than 170 ml/100 g, the masking capability of carbon black may deteriorate.

Examples of the metal that forms the metal oxide include zinc, magnesium, aluminum, iron, titanium, silicon, antimony, tin, copper, manganese, cobalt, vanadium, niobium, molybdenum, ruthenium, tungsten, palladium, silver, platinum, and the like. Examples of a complex metal oxide include ITO, ATO, AZO, and the like.

Examples of the metal sulfide include zinc sulfide, cadmium sulfide, and the like. Examples of the carbonate include calcium carbonate and the like. Examples of the metal silicate include alumina silicate, iron-containing alumina silicate (mica), hydrous alumina silicate (kaolin), magnesium silicate (talc), calcium silicate, magnesium silicate, and the like.

The average particle size of the metal oxide, the complex metal oxide, and the metal sulfide is preferably less than 150 nm, and more preferably less than 100 nm.

Carbon black, the metal oxide, and the complex metal oxide are preferably used as the energy absorber either individually or in combination.

Carbon black is used in an amount of 0.0001 to 3 parts by mass, and more preferably 0.0001 to 1 part by mass. When using a mixture of carbon black and at least one compound selected from the metal oxide, the metal sulfide, the metal carbonate, and the metal silicate having an average particle size of less than 150 nm, the mixture is used in an amount of 0.0001 to 6 parts by mass, and more preferably 0.0001 to 3 parts by mass.

The amount of the energy absorber is adjusted within the above desired range so that a transparent multilayer sheet A is obtained. Specifically, colors, images, characters, and the like are normally printed on the multilayer sheet B positioned under the multilayer sheet A. In this case, if the multilayer sheet A has poor transparency, the colors, images, characters, and the like may be blurred. Therefore, it is preferable to use carbon black having a small average particle size, or a mixture of carbon black and at least one compound selected from the metal oxide, the metal sulfide, the metal carbonate, and the metal silicate having an average particle size of less than 150 nm, preferably less than 100 nm, and more preferably less than 50 nm.

If the average particle size of the laser energy absorber is more than 150 nm, the transparency of the transparent laser marking multilayer sheet A may deteriorate. If the amount of the laser energy absorber is more than 6 parts by mass, the transparency of the multilayer sheet A may also deteriorate. Moreover, the resin may deteriorate since the laser energy absorber absorbs too large an amount of energy. This may make it difficult to achieve sufficient contrast. If the amount of the laser energy absorber is less than 0.0001 parts by mass, it may be difficult to achieve sufficient contrast.

[A-1-4] Antioxidant and/or Coloring Inhibitor

It is preferable that an antioxidant and/or a coloring inhibitor is included 0.1 to 5 parts by mass based on 100 parts by mass of the polycarbonate resin in case of the core layer of core layer and/or skin layer, or by mass of the copolyester resin in case of the skin layer. The addition (combination) of the antioxidant and/or the coloring inhibitor effectively prevents a deterioration in properties due to a decrease in molecular weight during molding, or effectively stabilizes the hue. As the antioxidant and/or the coloring inhibitor, a phenol antioxidant or a phosphite ester coloring inhibitor is used.

Examples of the phenol antioxidant include α-tocopherol, butylhydroxytoluene, sinapyl alcohol, vitamin E, n-octadecyl-3-(3,5-di-t-butyl-4-hydroxyphenyl)propionate, 3,5-di-t-butyl-4-hydroxytoluene, pentaerythrityl-tetrakis[3-(3,5-di-t-butyl-4-hydroxyphenyl) propionate],triethylene glycol-bis [3-(3-t-butyl-5-methyl-4-hydroxyphenyl)propionate], 1,6-hexanediol-bis[3-(3,5-di-t-butyl-4-hydroxyphenyl) propionate], 2-tert-butyl-6-(3'-tert-butyl-5'-methyl-2'-hydroxybenzyl)4-methylphenyl acrylate, 2,6-di-tert-butyl-4-(N,N-dimethylaminomethyl)phenol, 3,5-di-tert-butyl-4-hydroxybenzylphosphonatediethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidenebis(3-methyl-6-tert-butylphenol), triethylene glycol-N-bis-3-(3-tert-butyl-4-hydroxy-5-methylphenyl)propionate, 1,6-hexanediolbis[3-(3,5-di-tert-butyl-4-hydroxyphenyl)propionate], bis[2-tert-butyl-4-methyl-6-(3-tert-butyl-5-methyl-2hydroxybenzyl) phenyl]terephthalate, 3,9-bis{2-[3-(3-tert-butyl-4-hydroxy-5methylphenyl)propionyloxy]-1,1,-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-thiodiethylenebis-[3-(3,5-di-tert-butyl-4hydroxyphenyl) propionate], 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris (2-methyl-4-hydroxy-5-tert-butylphenyl)butane, 1,3,5-trimethyl-2,4,6-tris(3,5-di-tert-butyl-4-hydroxybenzyl) benzene, tris(3,5-di-tert-butyl-4-hydroxyphenyl) isocyanurate, tris(3,5-di-tert-butyl-4-hydroxybenzyl) isocyanurate, 1,3,5-tris(3,5-di-tert-butyl-4-hydroxyphenyl) isocyanurate, 1,3,5-tris(4-tert-butyl-3-hydroxy-2,6-dimethylbenzyl)isocyanurate, 1,3,5-tris2[3(3,5-di-tert-butyl-4-hydroxyphenyl)propionyloxy]ethylisocyanurate, tetrakis [3-(3,5-di-tert-butyl-4-hydroxyphenyl)propionyloxymethyl] methane, and the like.

Among these, n-octadecyl-3-(3,5-di-tert-butyl-hydroxyphenyl)propionate, 1,3,5-trimethyl-2,4,6-tris(3,5-di-tert-butyl-4-hydroxybenzyl)benzene, 1,3,5-tris(3,5-di-tert-butyl-4-hydroxybenzyl)isocyanurate, tetrakis[3-(3,5-di-tert-butyl-4-hydroxyphenyl)propionyloxymethyl]methane are preferable, and n-octadecyl-3-(3,5-di-tert-butyl-hydroxyphenyl)propionate is particularly preferable. These hindered phenol antioxidants may be used either individually or in combination.

Examples of the phosphite ester coloring inhibitor include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, 2,2-methylenebis(4,6-di-tert-butylphenyl)octyl phosphite, tris(diethylphenyl)phosphite, tris(diisopropylphenyl) phosphite, tris(di-n-butylphenyl)phosphite, tris(2,4-di-tert-butylphenyl)phosphite, tris(2,6-di-tert-butylphenyl) phosphite, distearylpentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, phenylbisphenol A pentaerythritol diphosphite, bis(nonylphenyl)pentaerythritol diphosphite, dicyclohexylpentaerythritol diphosphite, and the like.

A phosphite compound that reacts with a dihydric phenol and has a cyclic structure may also be used. Examples of such a phosphite compound include 2,2'-methylenebis(4,6-di-tert-butylphenyl)(2,4-di-tert-butylphenyl)phosphite, 2,2'-methylenebis(4,6-di-tert-butylphenyl)(2-tert-butyl-4-methylphenyl)phosphite, 2,2'-methylenebis(4-methyl-6-tert-butylphenyl)(2-tert-butyl -4-methylphenyl)phosphite, 2,2'-ethylidenebis(4-methyl-6-tert-butylphenyl)(2-tert-butyl-4-methylphenyl)phosphite, and the like.

Among these, tris(2,4-di-tert-butylphenyl)phosphite is particularly preferable. These phosphite ester coloring inhibitors may be used either individually or in combination. The phosphite ester coloring inhibitor may be used in combination with the phenol antioxidant.

I It is preferable that a UV absorber and/or a light stabilizer is included 0.1 to 5 parts by mass based on 100 parts by mass of the polycarbonate resin in case of the core layer of core layer and/or skin layer, or by mass of the copolyester resin in case of the skin layer. The addition (combination) of the UV absorber and/or the light stabilizer effectively suppresses a decrease in light resistance during storage of the transparent laser marking multilayer sheet A, or during use of an electronic passport or a plastic card as a final product.

Examples of the UV absorber include benzotriazole compounds such as 2-(2'-hydroxy-5'-methylphenyl)benzotriazole, 2-(2'-hydroxy-3',5'-di-tert-amylphenyl)benzotriazole, 2-(2'-hydroxy-3',5'-bis(α,α'-dimethylbenzyl)phenylbenzotriazole, 2,2'-methylenebis[4-(1,1,3,3-tetramethylbutyl)-6-(2H-benzotriazol-2-yl)phenol], and methyl-3-[3-tert-butyl-5-(2H-benzotriazol-2-yl)-4hydroxyphenyl propionate-polyethylene glycol.

Further examples of the UV absorber include hydroxyphenyltriazine compounds such as 2-(4,6-diphenyl-1,3,5-triazin-2-yl)-5-hexyloxyphenol and 2-(4,6-bis(2,4-dimethylphenyl)-1,3,5-triazin-2-yl)-5-hexyloxyphenol.

Further examples of the UV absorber include cyclic imino ester compounds such as 2,2'-p-phenylenebis(3,1-benzoxazin-4-one), 2,2'-m-phenylenebis(3,1-benzoxazin-4-one), and 2,2'-p,p'-diphenylenebis(3,1-benzoxazin-4-one).

Examples of the light stabilizer include hindered amine light stabilizers such as bis(2,2,6,6-tetramethyl-4-piperidyl) sebacate, bis(1,2,2,6,6-pentamethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, poly{[6-(1,1,3,3-tetramethylbutyl)amino-1,3,5-triazine-2,4-diyl][(2,2,6,6-tetramethylpiperidyl)imino]hexamethylene[(2,2,6,6-tetramethylpiperidyl)imino]}, and polymethylpropyl-3-oxy-[4-(2,2,6,6-tetramethyl)piperidinyl]siloxane. The light stabilizer achieves more excellent weatherability and the like when used in combination with the UV absorber or the antioxidant.

[A-1-5] Mat finish

It is preferable that each side of the multilayer sheet A be provided with a mat finish, and has an average roughness (Ra) of 0.1 to 5 μm. For example, when the laser marking multilayer sheet includes the multilayer sheet A and the multilayer sheet B, and is subjected to hot pressing, air is easily removed from the space between the multilayer sheet A and the multilayer sheet B when the surface of the multilayer sheet A has been provided with a mat finish. When transferring the multilayer sheets to the stacking process, the multilayer sheets are transferred under adsorption, positioned, and stacked. If the surface of the multilayer sheet A is not provided with a mat finish, it may be difficult to remove the multilayer sheet by injecting air, or a positioning error may occur. If the average roughness (Ra) exceeds 5 μm, the thermal adhesiveness of the transparent laser marking multilayer sheet A and the colored laser marking multilayer sheet may decrease.

If the average roughness (Ra) is less than 0.1 μm, the sheet may stick to a transfer machine when transferring and stacking the sheet.

[B] Configuration of Multilayer Sheet B

The multilayer sheet B is the laser marking multilayer sheet that includes the skin layer and the core layer, and includes at least three layers stacked by a coextrusion method.

Note that detailed description of the features of the multilayer sheet B that are identical with those of the multilayer sheet A is omitted for convenience. The following description focuses on the features of the multilayer sheet B that differ from those of the multilayer sheet A. Refer to the description of the multilayer sheet A as to the features of the multilayer sheet B that are identical with those of the multilayer sheet A.

[B-1] Three-layer Sheet

The multilayer sheet B has at least a three-layer structure that includes the skin layer and the core layer, and is formed by a coextrusion method. Refer to the section entitled "[A-1] Three-layer sheet" as to the definition of the term "three-layer sheet".

It is preferable that the three-layer sheet have a thickness (total thickness) of 50 to 250 μm, and the thickness of the core layer account for 35% or more and less than 85% of the total thickness of the three-layer sheet. If the total thickness of the three-layer sheet is less than 50 μm, the multilayer sheet may stick to a mold (i.e., mold sticking phenomenon) during heating when producing the multilayer sheet. In order to prevent such a problem, it is necessary to control the bonding temperature, the press pressure during bonding, the bonding time, and the like. This makes the forming process complex. If the total thickness of the three-layer sheet is more than 250 μm, the total thickness of an electronic passport multilayer sheet produced using the three-layer sheet increases to a large extent. When using the three-layer sheet for a plastic card, the thickness of the card may exceed 800 μm (i.e., the maximum thickness defined by a normal contact/contactless card standard). This impairs the versatility of the card. It is preferable that the total thickness of the core layer account for 35% or more and less than 85% of the thickness of the multilayer sheet B. If the thickness of the skin layer is too small, a mold sticking phenomenon and a decrease in thermal adhesiveness may occur. If the thickness of the skin layer is too large, the thickness of the core layer necessarily decreases, so that the laser marking capability may deteriorate, or the multilayer sheet may warp, for example.

It is possible to easily obtain the desired properties (local properties) of the multilayer sheet B by adjusting the total thickness of the three-layer sheet to the desired value. Moreover, it is possible to easily obtain the desired properties of the laser marking multilayer sheet (i.e., a multilayer sheet that includes the multilayer sheet A and the multilayer sheet B). The thickness of the three-layer sheet can be adjusted within the desired range, and the laser marking capability can be easily improved by adjusting the thickness of the skin layer and the core layer that form the three-layer sheet within the above desired range in addition to the total thickness of the three-layer sheet.

The adhesiveness of the multilayer sheet and prevention of a mold sticking phenomenon are important factors from the viewpoint of ensuring practical applications and the productivity of the multilayer sheet, dealing with market needs, and the like in the same manner as the multilayer sheet A. The relationship between the total thickness of the three-layer sheet and the thickness of the skin layer and the core layer is described in detail later.

[B-1-1] Configuration of Skin Layer of Multilayer Sheet B

The skin layer of the multilayer sheet B forms each outermost layer of the three-layer sheet in the same manner as in the multilayer sheet A. Specifically, the skin layer serves as the surface layer (outermost layer) of the three-layer sheet that covers either side (outer side) of the core layer of the multilayer sheet B described later.

It is preferable that each skin layer have an identical thickness. If the multilayer sheet B includes skin layers that differ in thickness, the sheet may warp during pressing or the like. For example, when the multilayer sheet has a skin layer (PETG)/core layer (PC)/skin layer (PETG) configuration, and the thickness of the core layer accounts for 35% or more and less than 85% of the thickness of the multilayer sheet B, the total thickness of the skin layers accounts for 15% or more and less than 65% of the thickness of the multilayer sheet B. If the thickness of the skin layer is too small, a mold sticking phenomenon and a decrease in thermal adhesiveness may occur. If the thickness of the skin layer is too large, the thickness of the core layer necessarily decreases, so that the laser marking capability may deteriorate, or the multilayer sheet may warp, for example.

[B-1-1-1] Copolyester Resin

The definition of the copolyester resin that forms the multilayer sheet B is the same as the definition of the copolyester resin that forms the transparent laser marking multilayer sheet A. Refer to the section entitled "[A-1-1-1] Copolyester resin".

[B-1-1-2] Lubricant

The lubricant is used in an amount of 0 to 3 parts by mass based on 100 parts by mass of the copolyester resin. When the laser marking multilayer sheet has a multilayer sheet A/multilayer sheet B/multilayer sheet A configuration, since the multilayer sheet B does not form the outermost surface of the laminate, the lubricant need not be added to the multilayer sheet B. When bonding a laminate having a multilayer sheet A/multilayer sheet B configuration or a multilayer sheet B/another sheet/multilayer sheet B configuration, printing images and the like on the surface of the laminate, and then stacking (bonding) the multilayer sheet A on each side of the laminate, the lubricant must be added to the multilayer sheet B since the multilayer sheet B forms the outermost surface of the laminate in the first half of the process. Specifically, whether or not to use the lubricant is determined depending on the usage and the stacking pattern of the multilayer sheet B.

The definition of the lubricant that may be added to the multilayer sheet B is the same as the definition of the lubricant used for the multilayer sheet A. Refer to the section entitled "[A-1-1-2] Lubricant".

[B-1-2] Configuration of Core Layer of Multilayer Sheet B

The core layer of the multilayer sheet B is positioned in the center of the three-layer sheet in the same manner as in the multilayer sheet A. Specifically, the core layer is formed so that the core layer is positioned between the skin layers (outermost layers).

It is preferable that the thickness of the core layer account for 35% or more and less than 85% of the thickness of the multilayer sheet B. It is more preferable that the thickness of the core layer account for 40% or more and less than 80% of the thickness of the multilayer sheet B. If the thickness of the core layer accounts for 85% or more of the thickness of the multilayer sheet B, the thickness of the skin layer relatively decreases since the thickness of the multilayer sheet B is as small as 50 to 250 μm. As a result, even if the skin layer includes the lubricant, the multilayer sheet B may stick to a mold during hot pressing when stacking the layers (i.e., a mold sticking phenomenon may occur). If the thickness of the core layer accounts for less than 35% or more of the thickness of the multilayer sheet B, the laser marking capability may deteriorate, or the sheet may warp due to a decrease in heat resistance, although a mold sticking phenomenon does not occur since the skin layer has a sufficient thickness.

The material for the core layer is the same as that of the multilayer sheet A.

[B-1-2-1] Inorganic Pigment for Coloring

The multilayer sheet B is a colored laser marking multilayer sheet. The core layer of the multilayer sheet B includes the inorganic pigment for coloring in an amount of 1 part by mass or more based on 100 parts by mass of the polycarbonate resin. The multilayer sheet B differs from the multilayer sheet A as to this point. When the core layer of the multilayer sheet B includes the inorganic pigment for coloring in an amount of 1 part by mass or more, contrast is improved when marking the laminate of the transparent laser marking multilayer sheet A and the colored laser marking multilayer sheet B by applying a laser beam, so that characters, numerals, and images become clear.

Examples of the inorganic pigment for coloring include white pigments such as titanium oxide, barium oxide, and zinc oxide, yellow pigments such as iron oxide and titanium yellow, red pigments such as iron oxide, blue pigments such as cobalt blue and ultramarine, and the like. It is preferable to use an inorganic pigment for coloring that has a pale color in order to improve contrast.

It is more preferable to use a white inorganic pigment that achieves an excellent contrast.

[B-1-3] Energy Absorber

The type and the amount of the energy absorber used for the multilayer sheet B are the same as those of the multilayer sheet A. Refer to the description given above in connection with the multilayer sheet A.

[B-1-4] Antioxidant and/or Coloring Inhibitor

The antioxidant and/or the coloring inhibitor used for the multilayer sheet B is the same as the antioxidant and/or the coloring inhibitor used for the transparent laser marking multilayer sheet A. The UV absorber and/or the light stabilizer used for the multilayer sheet B is the same as the UV absorber and/or the light stabilizer used for the transparent laser marking multilayer sheet A. Refer to the description given above in connection with the multilayer sheet A.

[B-1-5] Mat Finish

The multilayer sheet B is provided with a mat finish in the same manner as the transparent laser marking multilayer sheet A. Refer to the description given above in connection with the multilayer sheet A.

[C] Relationship Between Multilayer Sheet A and Multilayer Sheet B

The effects of the present invention can be achieved by stacking the multilayer sheet A and the multilayer sheet B as described above. Specifically, the multilayer sheet A is the transparent laser marking three-layer (PETG/PC (laser marking)/PETG) sheet. When stacking the PETG/PC (colored laser marking)/PETG colored laser marking multilayer sheet B on the side of the multilayer sheet A opposite to the side to which a laser beam is applied, and applying a laser beam to the upper layer (multilayer sheet A), the laser beam blackens the area of the core layer PC to which the laser beam is applied, passes through the upper layer (multilayer sheet A), and blackens the core layer PC of the lower layer (multilayer sheet B). This improves the degree of blackness of the area to which a laser beam is applied.

It is important to control the reflectivity and the contrast in order to obtain a sufficiently clear image (e.g., face) by laser marking. For example, the image may be blurred when the reflectivity is insufficient, or the contrast is low. When forming a laminate by thermally bonding a PETG/PC (white)/PETG three-layer sheet that is not compliant with laser marking on the multilayer sheet A (PETG/PC (laser marking)/PETG (transparent laser marking three-layer sheet), the reflectivity may be insufficient since the lower layer sheet includes the transparent PETG layer. When using a PC (white) sheet under the multilayer sheet A instead of the PETG/PC (white)/PETG three-layer sheet taking account of the reflectivity and the contrast, the reflectivity is improved as compared with the case of using the PETG/PC (white)/PETG three-layer sheet, and the contrast between the upper layer (multilayer sheet A) (black due to laser marking) and the lower layer (PC sheet) (white) is improved, so that a clear image is obtained. In this case, however, the lower layer (PC sheet) has poor thermal adhesiveness with the upper layer at a low temperature of about 120 to 150° C. The lower layer (PC sheet) can be bonded to the upper layer by increasing the temperature to 210 to 240° C. However, the PETG layer of the upper layer is softened and melted at 210 to 240° C., so that a laminate cannot be obtained.

When stacking the PETG/PC (colored laser marking)/PETG colored laser marking multilayer sheet B under the transparent laser marking three-layer (PETG/PC (laser marking)/PETG) sheet, a laser beam applied to the upper layer blackens the core layer PC of the upper layer, passes through the upper layer, and blackens the core layer PC of the lower layer. This improves the degree of blackness of the area to which the laser beam is applied, and ensures a contrast equal to that obtained when using a PC (white) sheet as the lower layer, so that a clear image can be obtained, and a problem does not occur due to thermal adhesiveness. Specifically, the effects of the present invention can be synergistically achieved by combining the desired multilayer sheets A and B.

Although the laser marking multilayer sheet in which the multilayer sheet B is positioned under the multilayer sheet A has been described above, the configuration of the laser marking multilayer sheet is not limited thereto. Specifically, the multilayer sheet A need not necessarily disposed as the upper layer, and the multilayer sheet B need not necessarily disposed as the lower layer. For example, the multilayer sheet A may be disposed as the lower layer, and the multilayer sheet B may be disposed as the upper layer. This is because an image or the like formed by laser marking may be observed in opposite directions. Specifically, when using the laser marking multilayer sheet for a booklet (e.g., passport), the multilayer sheet A disposed as the upper layer and the multilayer sheet B disposed as the lower layer are respectively disposed as the lower layer and the upper layer when the pages have been turned over. In any case, the multilayer sheet A is disposed on the side to which a laser beam is applied, and the multilayer sheet B is disposed so that a laser beam is applied to the multilayer sheet B through the multilayer sheet A. This makes it possible to obtain a clear image and high contrast using the multilayer sheet A and the multilayer sheet B by laser marking, so that the effects of the present invention can be achieved.

Note that the laser marking multilayer sheet of the embodiment need not necessarily be formed by stacking the multilayer sheet A/the multilayer sheet B. For example, when stacking the multilayer sheet A/the multilayer sheet B/the multilayer sheet A, a laminate may be obtained by thermally bonding the multilayer sheet B/another sheet/the multilayer sheet B, an image or the like may be printed on the surface of the laminate, and the multilayer sheet A/the laminate/the multilayer sheet A may then be stacked. This makes it possible to flexibly deal with an arbitrary laser marking multilayer sheet depending on the objective and usage and exhibits effect of the present invention.

[2] Applications

The laser marking multilayer sheet according to one embodiment of the present invention may suitably be used for an electronic passport or a plastic card.

Figure 2:
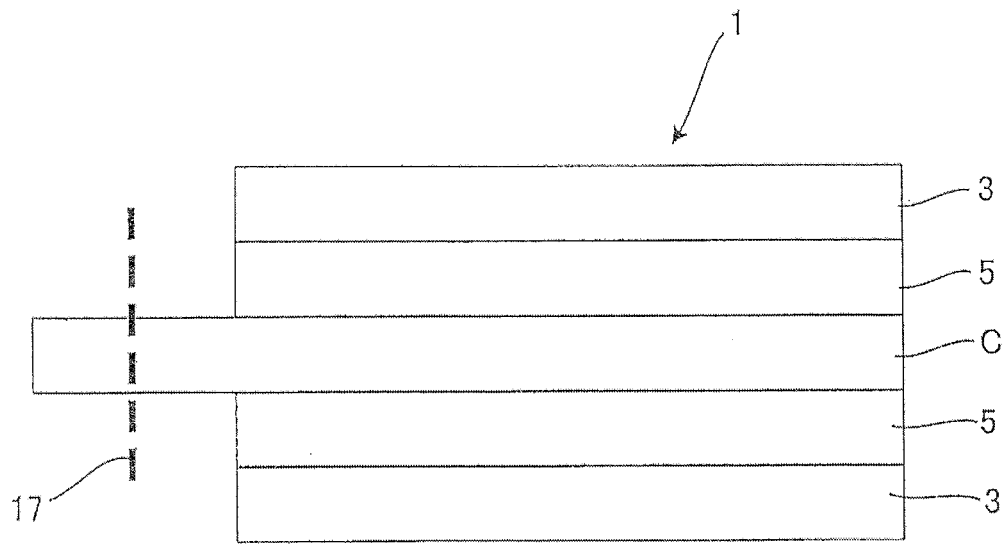
FIG. 2 is a schematic view showing an example in which a laser marking multilayer sheet according to one embodiment of the present invention is used for an electronic passport.
Figure 3:
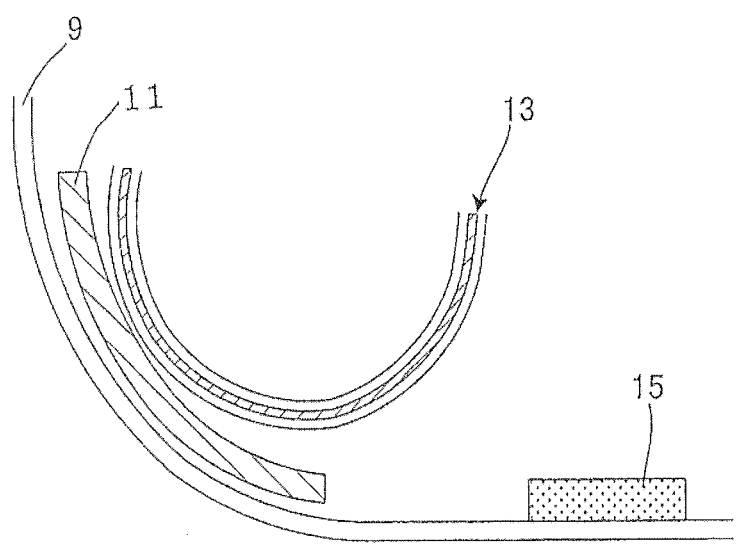
FIG. 3 is a schematic view showing an example in which a laser marking multilayer sheet according to one embodiment of the present invention is used for an electronic passport.

For example, when using the laser marking multilayer sheet for an electronic passport, two laser marking multilayer sheets are provided, as shown in FIG. 2. A laminate film C (e.g., polyester resin film, thermoplastic urethane resin film, nylon resin film, polyester cloth, or nylon cloth) is disposed between the laser marking multilayer sheets so that the laser marking multilayer sheets can be easily bound, and stitching portion 17 is formed, as required. As shown in FIG. 3, a cover 9, a laminate 11 using the laser marking multilayer sheet, a visa sheet 13, an IC chip 15, and the like may be disposed to produce an electronic passport. Note that the configuration of the electronic passport is not limited to this example.

[3] Method of Forming Multilayer Sheet A and Multilayer Sheet B

In the present invention, the three-layer transparent laser marking multilayer sheet A and the three-layer colored laser marking multilayer sheet B may be obtained by coextruding and stacking the resin composition for forming each layer by coextrusion method, forming each layer in the shape of a film, and laminating the layers, or forming two layers by the coextrusion method, and laminating another film on these layers, for example. It is preferable to employ the coextrusion method from the viewpoint of productivity and cost.

Specifically, the resin composition for forming each layer that has been optionally pelletized is supplied to the hopper of each three-layer T-die extruder (T-die is shared), melted and coextruded at a temperature of 200 to 280° C., and cooled (solidified) using a cooling roll or the like to form a three-layer laminate. Note that the transparent laser marking multilayer sheet A and the colored laser marking multilayer sheet B may be formed by an arbitrary method other than the above method. For example, the transparent laser marking multilayer sheet A and the colored laser marking multilayer sheet B may be formed in accordance with the method disclosed at pages (6) and (7) of JP-A-10-71763.

The multilayer sheet A and the multilayer sheet B thus obtained are stacked, and bonded (e.g., thermally bonded) at a desired temperature and a desired pressure for a desired time to obtain a laser marking multilayer sheet. More specifically, two kinds of three-layer sheet of the multilayer sheet A and the multilayer sheet B are extruded by melt coextrusion method, and wound in the shape of a roll. The multilayer sheet A/the multilayer sheet B/the multilayer sheet A, or the multilayer sheet B/another sheet/the multilayer sheet B are passed to heat and to press between heating rollers heated at a given temperature to obtain a long laminate. The laminate is then cut to given dimensions. Alternatively, the multilayer sheet A and the multilayer sheet B are cut to given dimensions, and processed using a hot press machine to obtain a sheet-shaped laminate in which the multilayer sheet A/the multilayer sheet B/the multilayer sheet A, or the multilayer sheet B/another sheet/the multilayer sheet B are stacked, for example.

The bonding time, the bonding pressure, and the bonding temperature are not particularly limited. It is preferable to appropriately select the bonding time, the bonding pressure, and the bonding temperature. The bonding time is normally about 10 seconds to 6 minutes, the bonding pressure is normally 1 to 20 MPa, and the bonding temperature is normally 100 to 160° C., for example.

[4] Laser Marking Method

The laser marking multilayer sheet according to one embodiment of the present invention is colored by applying a laser beam. Examples of the laser include gas lasers such as an He—Ne laser, an argon laser, a $Co_2$ laser, and an excimer laser, solid-state lasers such as a YAG laser and an $Nd.YVO_4$ laser, semiconductor lasers, dye lasers, and the like. Among these, a YAG laser and an $Nd.YVO_4$ laser are preferable.

Note that the above resin composition may optionally include other additives such as a release agent, a stabilizer, an antioxidant, a UV absorber, and a strengthening agent, insofar as the properties of the resin composition are not impaired.

In the laser marking method according to one embodiment of the present invention, a single-mode laser beam or a multi-mode laser beam may be used. A laser beam having a small beam diameter of 20 to 40 μm, or a laser beam having a large beam diameter of 80 to 100 μm may be used. It is preferable to use a single-mode laser beam having a beam diameter of 20 to 40 μm in order to obtain high contrast (i.e., 3 or more) between the print area and the base area.

When applying a laser beam to the laser marking multilayer sheet according to one embodiment of the present invention, the multilayer sheet A and the multilayer sheet B included in the laser marking multilayer sheet are colored, so that an image or the like can be formed synergistically, easily, and clearly. Therefore, the laser marking multilayer sheet according to one embodiment of the present invention has excellent laser marking capability, allows white characters, white symbols, a white pattern, or the like to be easily and clearly formed in the black base area on the surface thereof or at the interface between the support and the coating by applying a laser beam, and enables an information code (e.g., barcode) to be marked at a high resolution.

More preferable way is to print an image or the like on the abovementioned laser marking multilayer sheet by applying a laser beam 7 through the multilayer sheet A stacked on the laser marking multilayer sheet as shown in FIG. 1. An image or the like can be formed more synergistically, easily, and clearly by applying a desired laser beam to the laser marking multilayer sheet through the multilayer sheet A. Therefore, the laser marking multilayer sheet according to one embodiment of the present invention has excellent laser marking capability, allows white characters, white symbols, a white pattern, or the like to be easily and clearly formed in the black base area on the surface thereof or at the interface between the support and the coating by applying a laser beam, and enables an information code (e.g., barcode) to be marked at a high resolution.

EXAMPLES

The present invention is further described below by way of examples. Note that the present invention is not limited to the following examples. In the examples and comparative examples, the following evaluation and measurement methods were used.

[1] Sheet Transfer Capability

The transparent laser marking multilayer sheet A and the colored laser marking multilayer sheet B of Production Examples 1 to 7 were cut to dimensions of 100×300 mm, transferred using a sheet transfer machine, and stacked. The sheet transfer capability was evaluated in accordance with the following standard.
Good: No problem occurred.
Fair: The sheet could not be easily removed from adhered portion when stacking the sheets, and displaced.
Bad: The sheet could not be removed from adhered portion when stacking the sheets.

[2] Releasability After Hot Pressing

The stacked sheets were placed between two chrome-plated steel sheets, and held at a press temperature of 130° C. and a pressure of 50 kgf/cm$^2$ for 10 minutes. The sheets were then cooled to room temperature, and the sample placed between chrome-plated steel sheets were took out with the chrome-plated steel sheets. When removing off the chrome-plated steel sheets from the mold, the releasability of the sample from the mold was evaluated in accordance with the following standard.
Good: The sample could be easily removed.
Fair: The sample adhered to the mold to some extent, but could be removed. However, the surface of the sheet was damaged and the sample was unusable.
Bad: The sample adhered to the mold.

[3-1] Void Releasability

Bubbles remaining in the laminate after hot pressing were observed. The void releasability was evaluated in accordance with the following standard.
Good: No voids were observed in the laminate.
Bad: voids remained in the laminate.

[3-2] Thermal Adhesiveness

A cutter blade was lightly wedged between the sheets forming the laminate. The thermal adhesiveness was evaluated in accordance with the following standard.
Good: No delamination occurred.
Bad: Delamination occurred to some extent, or occurred over the entire laminate.

[4] Laser Marking Capability

The laser marking capability was evaluated using an Nd.YVO$_4$ laser ("LT-100SA" manufactured by Laser Technology Co. Ltd. or "RSM103D" manufactured by Rofin-Sinar Technologies, Inc.). Specifically, the laminate was marked at a laser scanning speed of 400 mm/sec. The laser marking capability was evaluated as follows based on contrast and the presence or absence of abnormalities (e.g., breaking of the surface layer).
Good: The contrast ratio was 3 or more, and breaking of the surface layer and resin burn were not occurred.
Fair: The contrast ratio was 2 or more and less than 3, and breaking of the surface layer and resin burn were not occurred.
Bad: The contrast ratio was less than 2, or breaking of the surface layer and resin burn were not occurred.

[5] Transparency of Transparent Laser Marking Multilayer Sheet A

The total light transmittance of the transparent laser marking multilayer sheet A was measured using a spectrophotometer ("EYE 7000" manufactured by GretagMacbeth GmbH).
Good: The total light transmittance was 80% or more.
Fair: The total light transmittance was 60% or more and less than 80%.
Bad: The total light transmittance was less than 60%.

Production Example 1

Transparent Laser Marking Multilayer Sheet A(1)

An amorphous polyester ("Easter GN071" manufactured by Eastman Chemical Company, EG/CHDM=70/30 mol %) was used as the material for the skin layer, and polycarbonate ("Tarflon FN2500A" manufactured by Idemitsu Kosan Co., Ltd., melt volume rate: 8 cm$^3$/10 min) was used as the material for the core layer. As a lubricant 0.3 parts by mass of calcium stearate was added to the amorphous polyester. As an energy absorber that absorbs a laser beam 0.001 parts by mass of carbon black ("#10" manufactured by Mitsubishi Chemical Corp., average particle size: 75 nm, DBP absorption: 86 ml/100 g), as a phenol antioxidant 0.1 parts of n-octadecyl-3-(3,5-di-t-butyl-4-hydroxyphenyl)propionate ("Irganox 1076" manufactured by Ciba Specialty Chemicals Inc.), and as a UV absorber 0.2 parts 2-(2'-hydroxy-3',5'-di-t-butylphenyl)-5-chlorobenzotriazole ("Tinuvin 327" manufactured by Ciba Specialty Chemicals Inc.) were added to the polycarbonate. A three-layer card core sheet (skin layer/core layer/skin layer) was produced by a T-die coextrusion method. The total thickness of the sheet was 100 μm, and the skin layers had an identical thickness. The sheet had a skin layer (27 μm)/core layer (46 μm)/skin layer (27 μm) configuration (i.e., the proportion of the thickness of the core layer was 46%). Each side of the sheet was provided with a mat finish with an average surface roughness (Ra) of 0.1 to 1.8 μm to obtain a three-layer transparent laser marking multilayer sheet A(1).

Production Example 2

Transparent Laser Marking Multilayer Sheet A(2)

A transparent laser marking multilayer sheet A(2) was obtained in the same manner as in Production Example 1. The total thickness of the sheet was 100 μm, and the skin layers disposed on both sides had an identical thickness. The sheet had a skin layer (40 μm)/core layer (20 μm)/skin layer (40 μm) configuration (i.e., the proportion of the thickness of the core layer was 20%). Each side of the sheet was provided with a mat finish with an average surface roughness (Ra) of 0.5 to 1.8 μm.

Production Example 3

Transparent Laser Marking Multilayer Sheet A(3)

A transparent laser marking multilayer sheet A(3) was obtained in the same manner as in Production Example 1, except that the sheet had a skin layer (5 μm)/core layer (90

μm)/skin layer (5 μm) configuration (i.e., the proportion of the thickness of the core layer was 90%).

Production Example 4

Transparent Laser Marking Multilayer Sheet A(4)

A transparent laser marking multilayer sheet A(4) was obtained in the same manner as in Production Example 1, except that the lubricant was not added to the amorphous polyester.

Production Example 5

Transparent Laser Marking Multilayer Sheet A(5)

A transparent laser marking multilayer sheet A(5) was obtained in the same manner as in Production Example 1, except that carbon black as laser beam energy absorber was not added to the core layer.

Production Example 6

Transparent Laser Marking Multilayer Sheet A(6)

A transparent laser marking multilayer sheet A(6) was obtained in the same manner as in Production Example 1, except that 5 parts by mass of carbon black as laser beam energy absorber was added to the core layer.

Production Example 7

Colored Laser Marking Multilayer Sheet B(1)

An amorphous polyester ("Easter GN071" manufactured by Eastman Chemical Company, EG/CHDM=70/30 mol %) was used as the material for the skin layer, and polycarbonate ("Tarflon FN2500A" manufactured by Idemitsu Kosan Co., Ltd., melt volume rate: 8 cm³/10 min) was used as the material for the core layer. As a lubricant 0.3 parts by mass of calcium stearate was added to the amorphous polyester. As an energy absorber that absorbs a laser beam 0.001 parts by mass of carbon black, as a phenol antioxidant 0.1 parts n-octadecyl-3-(3,5-di-t-butyl-4-hydroxyphenyl)propionate ("Irganox 1076" manufactured by Ciba Specialty Chemicals Inc.) as a UV absorber 0.2 parts 2-(2'-hydroxy-3',5'-di-t-butylphenyl)-5-chlorobenzotriazole ("Tinuvin 327" manufactured by Ciba Specialty Chemicals), and 5 parts titanium oxide were added to the polycarbonate. A three-layer colored laser marking multilayer sheet B(1) sheet B(1) having skin layer/core layer/skin layer was produced by a T-die coextrusion method. The total thickness of the sheet was 150 μm, and the skin layers had an identical thickness. The sheet had a skin layer (20 μm)/core layer (110 μm)/skin layer (20 μm) configuration (i.e., the proportion of the thickness of the core layer was 73%). Each side of the sheet was provided with a mat finish with an average surface roughness (Ra) of 0.5 to 1.8 μm.

Production Example 8

Colored Laser Marking Multilayer Sheet B(2)

A colored laser marking multilayer sheet B(2) was obtained in the same manner as in Production Example 7, except that the sheet had a skin layer (60 μm)/core layer (30 μm)/skin layer (60 μm) configuration (i.e., the proportion of the thickness of the core layer was 20%).

Production Example 9

Colored Laser Marking Multilayer Sheet B(3)

A colored laser marking multilayer sheet B(3) was obtained in the same manner as in Production Example 7, except that the sheet had a skin layer (7.5 μm)/core layer (135 μm)/skin layer (7.5 μm) configuration (i.e., the proportion of the thickness of the core layer was 90%).

Production Example 10

Colored Laser Marking Multilayer Sheet B(4)

A colored laser marking multilayer sheet B(4) was obtained in the same manner as in Production Example 7, except that carbon black (laser beam energy absorber) was not added to the core layer.

Production Example 11

Colored Laser Marking Multilayer Sheet B(5)

A colored laser marking multilayer sheet B(5) was obtained in the same manner as in Production Example 7, except that titanium oxide was not added to the core layer.

Above mentioned Production Examples 1 to 11 having constitution form shown in Tables 1 to 3 were evaluated as Example 1 and Comparative Examples 1 to 9. The results are shown in Tables 1 to 3.

TABLE 1

|  | Example 1 | Comparative Example 1 | Comparative Example 2 | Comparative Example 3 |
|---|---|---|---|---|
| Transparent laser marking multilayer sheet A | Production Example 1 Multilayer sheet A(1) | Production Example 2 Multilayer sheet A(2) | Production Example 3 Multilayer sheet A(3) | Production Example 4 Multilayer sheet A(4) |
| Colored laser marking multilayer sheet B | Production Example 7 Multilayer sheet B(1) | Production Example 7 Multilayer sheet B(1) | Production Example 7 Multilayer sheet B(1) | Production Example 7 Multilayer sheet B(1) |
| Laminate configuration | A(1)/B(1) | A(2)/B(1) | A(3)/B(1) | A(4)/B(1) |
| Sheet transfer capability | Good | Good | Good | Good |
| Releasability | Good | Good | Fair | Bad |
| Bubble removability | Good | Good | Good | Good |
| Thermal adhesiveness | Good | Good | Fair | Good |
| Transparency of transparent laser marking multilayer sheet A | Good | Good | Good | Good |
| Laser marking capability | Good | Bad | Good | Good |

TABLE 2

|  | Comparative Example 4 | Comparative Example 5 | Comparative Example 6 |
|---|---|---|---|
| Transparent laser marking multilayer sheet A | Production Example 5 Multilayer sheet A(5) | Production Example 6 Multilayer sheet A(6) | Production Example 1 Multilayer sheet A(1) |
| Colored laser marking multilayer sheet B | Production Example 7 Multilayer sheet B(1) | Production Example 7 Multilayer sheet B(1) | Production Example 8 Multilayer sheet B(2) |
| Laminate configuration | A(5)/B(1) | A(6)/B(1) | A(1)/B(2) |
| Sheet transfer capability | Good | Good | Good |
| Releasability | Good | Good | Good |
| Bubble removability | Good | Good | Good |
| Thermal adhesiveness | Good | Good | Good |
| Transparency of transparent laser marking multilayer sheet A | Good | Bad | Good |
| Laser marking capability | Bad | Fair | Bad |

TABLE 3

|  | Comparative Example 7 | Comparative Example 8 | Comparative Example 9 |
|---|---|---|---|
| Transparent laser marking multilayer sheet A | Production Example 1 Multilayer sheet A(1) | Production Example 1 Multilayer sheet A(1) | Production Example 1 Multilayer sheet A(1) |
| Colored laser marking multilayer sheet B | Production Example 9 Multilayer sheet B(3) | Production Example 10 Multilayer sheet B(4) | Production Example 11 Multilayer sheet B(5) |
| Laminate configuration | A(1)/B(3) | A(1)/B(4) | A(1)/B(5) |
| Sheet transfer capability | Good | Good | Good |
| Releasability | Good | Good | Good |
| Bubble removability | Good | Good | Good |
| Thermal adhesiveness | Fair | Good | Good |
| Transparency of transparent laser marking multilayer sheet A | Good | Good | Good |
| Laser marking capability | Good | Fair | Bad |

Discussion

As shown in Tables 1 to 3, the laser marking multilayer sheet of Example 1 exhibited excellent transfer capability, releasability after hot pressing, void releasability, thermal adhesiveness, and laser marking capability. Experiments were conducted using a sheet produced in the same manner as in Example 1, except that the sheet was not provided with a mat finish. The resulting sheet had no problem during use. However, it was found that it is preferable to provide the sheet with a mat finish from the viewpoint of improving the yield.

On the other hand Comparative Example 1 had inferior laser marking capability since the proportion of the thickness of the core layer of the transparent laser marking multilayer sheet A(2) was 20%. Comparative Example 2 had defects in releasability after hot pressing and thermal adhesiveness since the proportion of the thickness of the core layer of the transparent laser marking multilayer sheet A(3) was 90% (i.e., the thickness of the skin layer was small). Comparative Example 3 had inferior releasability after hot pressing and was out of practical use since the lubricant was not added to the skin layer of the transparent laser marking multilayer sheet A(4).

The laser marking multilayer sheet of Comparative Example 4 had inferior laser marking capability since carbon black as a laser beam energy absorber was not added to the core layer of the transparent laser marking multilayer sheet A(5). The laser marking multilayer sheet of Comparative Example 5 had inferior transparency and laser marking capability since the amount of carbon black as a laser beam energy absorber added to the core layer of the transparent laser marking multilayer sheet A(6) was increased to 5 parts by mass.

The laser marking multilayer sheet of Comparative Example 6 had inferior laser marking capability since the proportion of the thickness of the core layer of the colored laser marking multilayer sheet B(2) was 20%. The laser marking multilayer sheet of Comparative Example 7 had inferior thermal adhesiveness since the proportion of the thickness of the core layer of the colored laser marking multilayer sheet B(3) was 90% (i.e., the thickness of the skin layer was small). The laser marking multilayer sheet of Comparative Example 8 had inferior laser marking capability since carbon black as a laser beam energy absorber was not added to the core layer of the colored laser marking multilayer sheet B(4). The laser marking multilayer sheet of Comparative Example 9 had inferior laser marking capability since titanium oxide was not added to the core layer of the colored laser marking multilayer sheet B(5).

Industrial Applicability

The transparent laser marking multilayer sheet A and the colored laser marking multilayer sheet B according to the present invention are non-PVC multilayer sheets. A laminate having multilayer sheet A/multilayer sheet B exhibits excellent laser marking capability (i.e., clear characters, numerals, and images can be formed by applying a laser beam), exhibits excellent transfer capability, stacking capability, and thermal adhesiveness and does not warp during stacking and hot pressing, exhibits excellent heat resistance, and may be suitably used for an electronic passport or a plastic card.

Explanation of Symbols

1: laser marking multilayer sheet, 3: multilayer sheet A, 3a: skin layer (of multilayer sheet A), 3b: core layer (multilayer sheet A), 5: multilayer sheet B, 5a: skin layer (multilayer sheet B), 5b: core layer (of multilayer sheet B), 7: laser beam, 9: cover, 11: laminate, 13: visa sheet, 15: IC chip, 17: stitching portions, C: laminate film

The invention claimed is:

1. A laser marking multilayer sheet comprising a multilayer sheet A, and a multilayer sheet B that is stacked on the multilayer sheet A, the multilayer sheet A being a transparent laser marking multilayer sheet that includes a skin layer and a core layer, and includes at least three layers stacked by a coextrusion method, the skin layer that forms each outermost layer of the multilayer sheet A being formed of a noncrystalline aromatic polyester resin composition that includes based on 100 parts by mass of a copolyester resin, 0.01 to 3 parts by mass of at least one lubricant selected from a fatty acid ester, a fatty acid amide, and a fatty acid metal salt, the copolyester resin including dicarboxylic acid units mainly including terephthalic acid units, ethylene glycol units (I), and glycol units mainly including 1,4-cyclohexanedimethanol units (II), the ratio ((I)/(II)) of the ethylene glycol units (I) to the 1,4-cyclohexanedimethanol units (II) being 90 to 30/10 to 70 mol %, the core layer of the multilayer sheet A being formed of a polycarbonate resin composition that includes based on 100 parts by mass of a polycarbonate resin, 0.0001 to 3 parts by mass of carbon black that is an energy absorber, or a mixture of 0.0001 to 3 parts by mass of carbon black and 0 to 6 parts by mass of at least one compound selected from a metal oxide, a metal sulfide, a metal carbonate, and a metal silicate having an average particle size of less than 150 nm, the multilayer sheet A having a thickness of 50 to 150 μm, and the thickness of the core layer accounting for 35% or more and less than 85% of the total thickness of the multilayer sheet A, the multilayer sheet B being a colored laser marking multilayer sheet that includes a skin layer and a core layer, and includes at least three layers stacked by a coextrusion method, the skin layer that forms each outermost layer of the multilayer sheet B being formed of a noncrystalline aromatic polyester resin composition that includes based on 100 parts by mass of a copolyester resin, 0 to 3 parts by mass of at least one lubricant selected from a fatty acid ester, a fatty acid amide, and a fatty acid metal salt, the copolyester resin including dicarboxylic acid units mainly including terephthalic acid units, ethylene glycol units (I), and glycol units mainly including 1,4-cyclohexanedimethanol units (II), the ratio ((I)/(II)) of the ethylene glycol units (I) to the 1,4-cyclohexanedimethanol units (II) being 90 to 30/10 to 70 mol %, the core layer of the multilayer sheet B being formed of a polycarbonate resin composition that includes based on 100 parts by mass of a polycarbonate resin, 0.0001 to 3 parts by mass of carbon black that is an energy absorber, or a mixture of 0.0001 to 3 parts by mass of carbon black and 0 to 6 parts by mass of at least one compound selected from a metal oxide, a metal sulfide, a metal carbonate, and a metal silicate, and 1 part by mass or more of an inorganic pigment, the multilayer sheet B having a thickness of 50 to 250 μm, and the total thickness of the core layer accounting for 35% or more and less than 85% of the thickness of the multilayer sheet B.

2. The laser marking multilayer sheet according to claim 1, the laser marking multilayer sheet being used for an electronic passport.

3. The laser marking multilayer sheet according to claim 1, the laser marking multilayer sheet being used for a plastic card.

4. A method of laser marking the laser marking multilayer sheet according to claim 1, the method comprising printing on the laser marking multilayer sheet by applying a laser beam to the laser marking multilayer sheet through the multilayer sheet A.

5. A method of laser marking the laser marking multilayer sheet according to claim 2, the method comprising printing on the laser marking multilayer sheet by applying a laser beam to the laser marking multilayer sheet through the multilayer sheet A.

6. A method of laser marking the laser marking multilayer sheet according to claim 3, the method comprising printing on the laser marking multilayer sheet by applying a laser beam to the laser marking multilayer sheet through the multilayer sheet A.

7. The laser marking multilayer sheet according to claim 1, wherein the core layer and/or the skin layer of the multilayer sheet A and/or the multilayer sheet B includes 0.1 to 5 parts by mass of an antioxidant and/or a coloring inhibitor and 0.1 to 5 parts by mass of a UV absorber and/or a light stabilizer based on 100 parts by mass of a thermoplastic resin which is the polycarbonate resin in a case where the core layer includes the antioxidant and/or the coloring inhibitor and the UV absorber and/or the light stabilizer, and which is the copolyester resin in a case where the skin layer includes the antioxidant and/or the coloring inhibitor and the UV absorber and/or the light stabilizer.

8. The laser marking multilayer sheet according to claim 7, 7, the laser marking multilayer sheet being used for an electronic passport.

9. The laser marking multilayer sheet according to claim 7, the laser marking multilayer sheet being used for a plastic card.

10. A method of laser marking the laser marking multilayer sheet according to claim 7, the method comprising printing on the laser marking multilayer sheet by applying a laser beam to the laser marking multilayer sheet through the multilayer sheet A.

11. A method of laser marking the laser marking multilayer sheet according to claim 8, the method comprising printing on the laser marking multilayer sheet by applying a laser beam to the laser marking multilayer sheet through the multilayer sheet A.

12. The laser marking multilayer sheet according to claim 1, wherein the surface of the multilayer sheet A and/or the multilayer sheet B has been provided with a mat finish with an average roughness (Ra) of 0.1 to 5 μm.

13. The laser marking multilayer sheet according to claim 12, the laser marking multilayer sheet being used for an electronic passport.

14. The laser marking multilayer sheet according to claim 12, the laser marking multilayer sheet being used for a plastic card.

15. A method of laser marking the laser marking multilayer sheet according to claim 12, the method comprising printing on the laser marking multilayer sheet by applying a laser beam to the laser marking multilayer sheet through the multilayer sheet A.

16. A method of laser marking the laser marking multilayer sheet according to claim 13, the method comprising printing on the laser marking multilayer sheet by applying a laser beam to the laser marking multilayer sheet through the multilayer sheet A.

17. The laser marking multilayer sheet according to claim 12, wherein the core layer and/or the skin layer of the multilayer sheet A and/or the multilayer sheet B includes 0.1 to 5 parts by mass of an antioxidant and/or a coloring inhibitor and 0.1 to 5 parts by mass of a UV absorber and/or a light stabilizer based on 100 parts by mass of a thermoplastic resin which is the polycarbonate resin in a case where the core layer includes the antioxidant and/or the coloring inhibitor and the UV absorber and/or the light stabilizer, and which is the copolyester resin in a case where the skin layer includes the antioxidant and/or the color inhibitor and the UV absorber and/or the light stabilizer.

18. The laser marking multilayer sheet according to claim 17, the laser marking multilayer sheet being used for an electronic passport.

19. The laser marking multilayer sheet according to claim 17, the laser marking multilayer sheet being used for a plastic card.

20. A method of laser marking the laser marking multilayer sheet according to claim 17, the method comprising printing on the laser marking multilayer sheet by applying a laser beam to the laser marking multilayer sheet through the multilayer sheet A.

* * * * *